(12) United States Patent
Farooq et al.

(10) Patent No.: US 11,420,583 B1
(45) Date of Patent: Aug. 23, 2022

(54) AIRBAG ASSEMBLY SUPPORTED BY ROOF MOUNTED PIVOTABLE BASE

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/167,665

(22) Filed: Feb. 4, 2021

(51) Int. Cl.
*B60R 21/214* (2011.01)
*A61G 3/08* (2006.01)
*B60R 21/232* (2011.01)

(52) U.S. Cl.
CPC .......... *B60R 21/214* (2013.01); *A61G 3/0808* (2013.01); *B60R 21/232* (2013.01)

(58) Field of Classification Search
CPC ................ B60R 21/214; B60R 21/232; B60R 2021/0253; B60R 2021/161; B60R 2021/23153; B60R 2021/23161; A61G 3/0808
See application file for complete search history.

(56) References Cited

U.S. PATENT DOCUMENTS

| | | | |
|---|---|---|---|
| 2,606,727 A * | 8/1952 | De Haven | B64D 25/04 244/118.6 |
| 3,753,576 A * | 8/1973 | Gorman | B60R 21/207 280/730.1 |
| 3,774,936 A * | 11/1973 | Barnett | B60R 21/214 280/730.1 |
| 3,922,029 A * | 11/1975 | Urai | B60N 2/4214 296/68.1 |
| 4,536,008 A * | 8/1985 | Brown, Jr. | B60R 21/213 280/730.1 |
| 5,470,103 A * | 11/1995 | Vaillancourt | B60R 21/214 280/730.1 |
| 6,935,456 B2 * | 8/2005 | Korechika | B60N 2/42745 180/268 |
| 7,364,185 B2 * | 4/2008 | Mori | B60N 2/42745 280/730.1 |
| 8,382,181 B2 * | 2/2013 | Bourgraf | B60N 2/0745 296/19 |
| 8,770,645 B2 * | 7/2014 | Bruns | B60N 2/245 296/65.01 |
| 9,296,351 B1 * | 3/2016 | Madrigal Medina | B60R 21/214 |

(Continued)

FOREIGN PATENT DOCUMENTS

DE 202012010337 U1 1/2013
JP 03281454 A * 12/1991

(Continued)

*Primary Examiner* — Laura Freedman
(74) *Attorney, Agent, or Firm* — Frank A. MacKenzie; Bejin Bieneman PLC (57) ABSTRACT

A vehicle includes a floor defining a seating area. The vehicle includes a roof above the floor. The vehicle includes a base supported by the roof and pivotable from a stowed position at the roof to a deployed position rearward of the seating area. The vehicle includes an airbag supported by the base and inflatable from an uninflated position to an inflated position that is forward of the base toward the seating area.

20 Claims, 5 Drawing Sheets

(56) References Cited

U.S. PATENT DOCUMENTS

| | | | |
|---:|---:|---|---|
| 9,428,138 B2 * | 8/2016 | Farooq | B60R 21/216 |
| 10,246,043 B2 * | 4/2019 | Schneider | B60R 21/207 |
| 10,703,324 B2 * | 7/2020 | Hill | B60R 21/231 |
| 10,836,337 B2 * | 11/2020 | Shin | B60R 21/01512 |
| 11,001,220 B2 * | 5/2021 | Fukawatase | B60R 21/232 |
| 2019/0248322 A1 * | 8/2019 | Herzenstiel | B60R 21/207 |
| 2019/0366968 A1 * | 12/2019 | Park | B60R 21/214 |
| 2019/0381968 A1 * | 12/2019 | Kwon | B60R 21/233 |
| 2020/0290549 A1 * | 9/2020 | Buice | B60R 21/0136 |
| 2021/0197748 A1 * | 7/2021 | Jeong | B60R 21/214 |

FOREIGN PATENT DOCUMENTS

| | | | | |
|---|---:|---|---|---|
| JP | 200567272 | A | | 3/2005 |
| JP | 4938969 | B2 | | 5/2012 |
| JP | 2015020509 | A | * | 2/2015 |
| JP | 2017065298 | A | * | 4/2017 |
| JP | 2018058431 | A | * | 4/2018 |
| JP | 2018161966 | A | * | 10/2018 |

* cited by examiner

AIRBAG ASSEMBLY SUPPORTED BY ROOF MOUNTED PIVOTABLE BASE

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a floor defining a seating area. The vehicle includes a roof above the floor. The vehicle includes a base supported by the roof and pivotable from a stowed position at the roof to a deployed position rearward of the seating area. The vehicle includes an airbag supported by the base and inflatable from an uninflated position to an inflated position that is forward of the base toward the seating area.

The base in the deployed position may include a proximate end at the roof and a distal end spaced from the roof, the airbag in the uninflated position being closer to the proximate end than the distal end.

The base may define an opening sized to receive handles of a personal mobility device secured in the seating area.

The vehicle may include an actuator that moves the base from the stowed position to the deployed position.

The vehicle may include a computer having a processor and memory storing instructions executable by the processor to command the actuator to move the base in response to detecting a personal mobility device in the seating area.

The vehicle may include a computer having a processor and memory storing instructions executable by the processor to inhibit the actuator from moving the base in response to detecting an object in a path of the base.

The vehicle may include an inflator fixed to the base and in fluid communication with the airbag.

The vehicle may include a brace connected to the base and the roof.

The brace may include a first bar and a second bar, the first bar connected to the second bar at a hinge.

The first bar may be connected to the roof opposite the hinge and the second bar is connected to the base opposite the hinge.

The brace may extend transverse to the roof and the base in the deployed position.

The brace may extend rearward from the base, away from the seating area, and toward the roof.

The vehicle may include a lock operatively engaged with the base to selectively maintain the base in the deployed position.

With reference to FIGS. 1-4, wherein like numerals indicate like parts throughout the several views, a vehicle 20 includes a floor 22 defining a seating area 24. The vehicle 20 includes a roof 26 above the floor 22. The vehicle 20 includes a base 28 supported by the roof 26 and pivotable from a stowed position at the roof 26 (illustrated in FIGS. 1 and 2) to a deployed position rearward of the seating area 24 (illustrated in FIGS. 3 and 4). The vehicle 20 includes an airbag 68 supported by the base 28 and inflatable from an uninflated position (illustrated in FIG. 3) to an inflated position that is forward of the base 28 toward the seating area 24 (illustrated in FIG. 4). The base 28 in the deployed position may position and support the airbag 68 in the inflated position to control kinematics of an occupant seated in the seating area 24, e.g., on a seat 30 or a personal mobility device 32. The base 28 in the stowed position may provide increased storage capability and/or visibility within a passenger compartment 34 of the vehicle 20.

In the present description, relative vehicular orientations and directions (by way of example, top, bottom, front, rear, outboard, inboard, inward, outward, lateral, left, right, etc.) is from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 straight.

The vehicle 20 may be any suitable type of automobile, e.g., a passenger or commercial automobile such as a sedan, a coupe, a truck, a sport utility, a crossover, a van, a minivan, a taxi, a bus, etc. The vehicle 20, for example, may be autonomous. In other words, the vehicle 20 may be autonomously operated such that the vehicle 20 may be driven without constant attention from a driver, i.e., the vehicle 20 may be self-driving without human input.

The vehicle 20 defines a longitudinal axis A1 extending between a front and a rear of the vehicle 20. The vehicle 20 defines a lateral axis A2 extending between a right side and a left side of the vehicle 20. The vehicle 20 defines a vertical axis A3 extending between a top and a bottom of the vehicle 20. The longitudinal axis A1, the lateral axis A2, and the vertical axis A3 are perpendicular relative to each other.

The vehicle 20 may include a body 36. The body 36 includes body panels partially defining an exterior of the vehicle 20. The body panels may present a class-A surface, e.g., a finished surface exposed to view by a customer and free of unaesthetic blemishes and defects. The body 36 includes, e.g., the floor 22, the roof 26, one or more pillars, etc. The roof 26 may extend along the longitudinal axis A1 and the lateral axis A2. The roof 26 is above and spaced from the floor 22 along the vertical axis A3. The roof 26 may include cross bars, an exterior roof body panel, a headliner, etc.

The body 36 may define the passenger compartment 34 to house occupants, if any, of the vehicle 20. The passenger compartment 34 may extend across the vehicle 20, i.e., from the right side to the left side of the vehicle 20. The passenger compartment 34 includes a front end and a rear end with the front end being in front of the rear end during forward movement of the vehicle 20. The passenger compartment 34 is between the roof 26 and the floor 22 along the vertical axis A3.

The floor 22 of the vehicle 20 supports objects, such as seats 30, occupants, the personal mobility device 32, etc., within the passenger compartment 34. The floor 22 may extend from the front end to the rear end of the passenger compartment 34 and from the right side to the left side of the vehicle 20. The floor 22 defines the seating area 24. The seating area 24 designates a position in the passenger compartment 34 for the occupant to occupancy. For example, the seating area 24 may be defined by anchors 38 of the floor 22. The anchors 38 may include fasters, reinforcement plates, etc. The anchors 38 may be connected to the seat 30 and/or a floor mount 40 configured to engage the personal mobility device 32 supported by the floor 22 within the seating area 24. The seating area 24 may surround the anchors 38.

Figure 2:
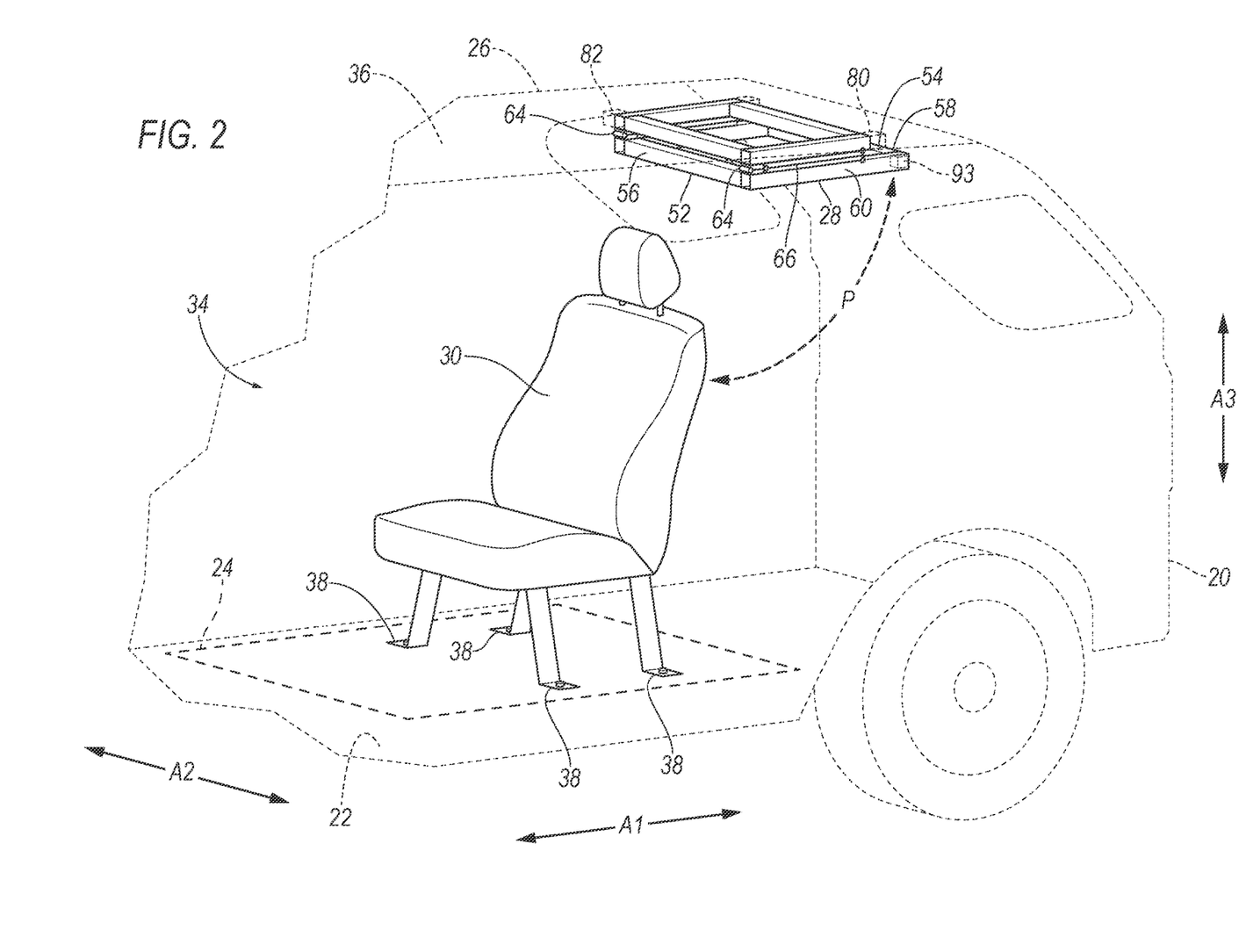
FIG. 2 is a perspective view of the vehicle support a seat and having the airbag supported by the base in the stowed position.

The seat 30, shown in FIG. 2, includes a seatback and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seatback may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback frame and may be foam or any other suitable material. The seat 30 may be removable and/or foldable, e.g., to provide space for the personal mobility device 32. The seat 30 may rotate, e.g., to face the front or the rear of the vehicle 20.

Figure 1:
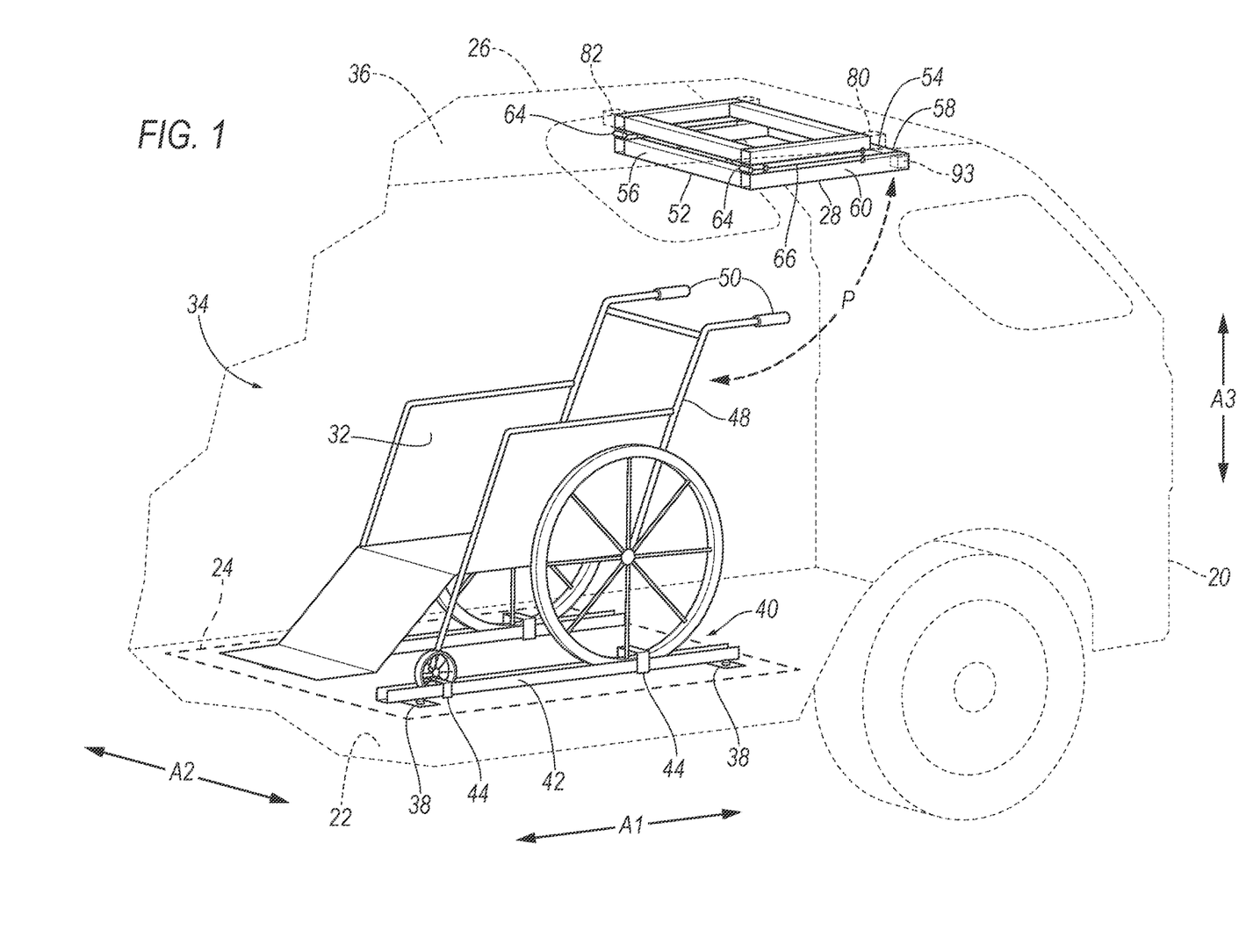
FIG. 1 is a perspective view of a vehicle supporting a personal mobility device and having an airbag supported by a base in a stowed position.
Figure 3:
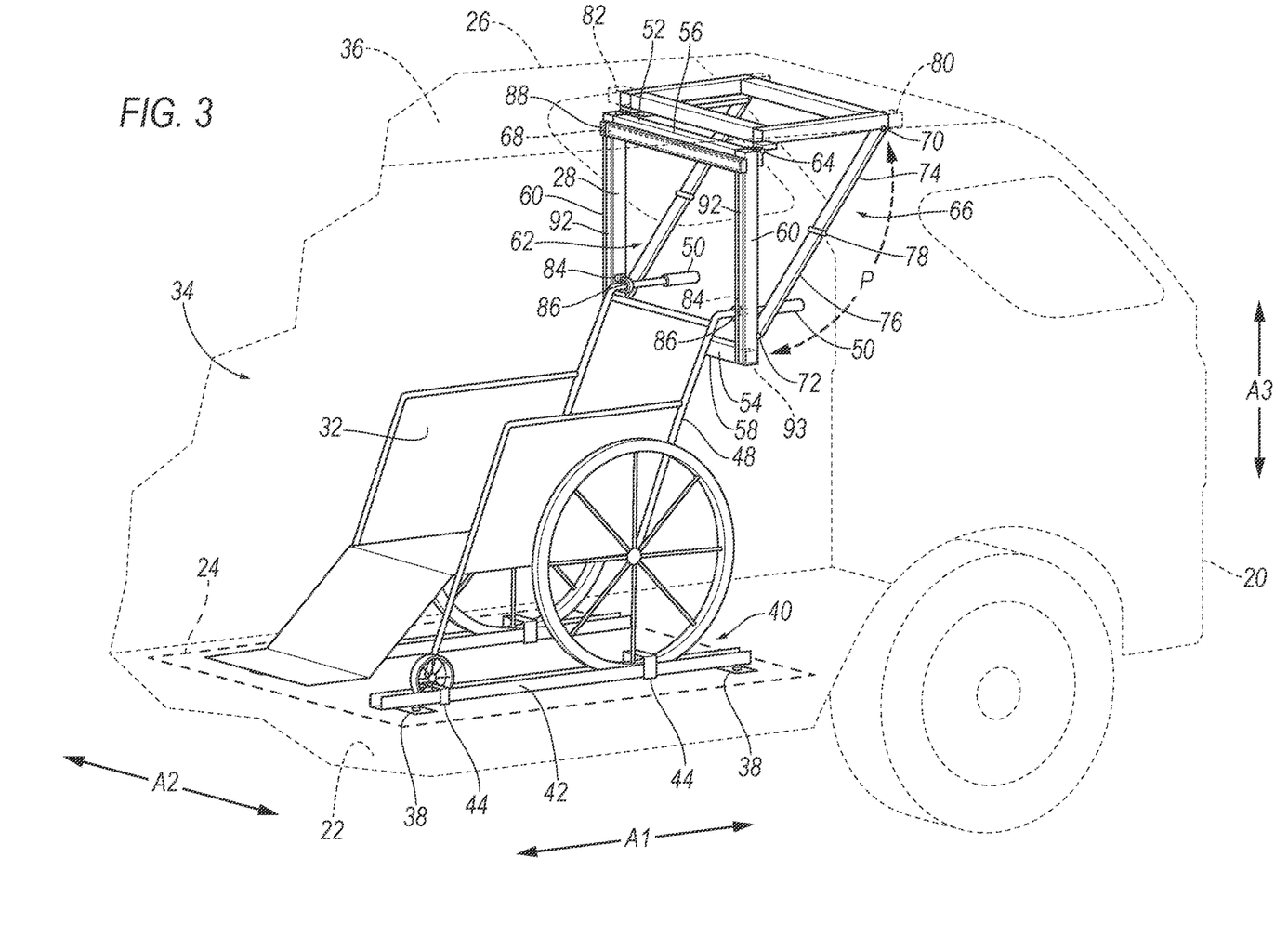
FIG. 3 is a perspective view of the vehicle having the airbag supported by the base in a deployed position.
Figure 4:
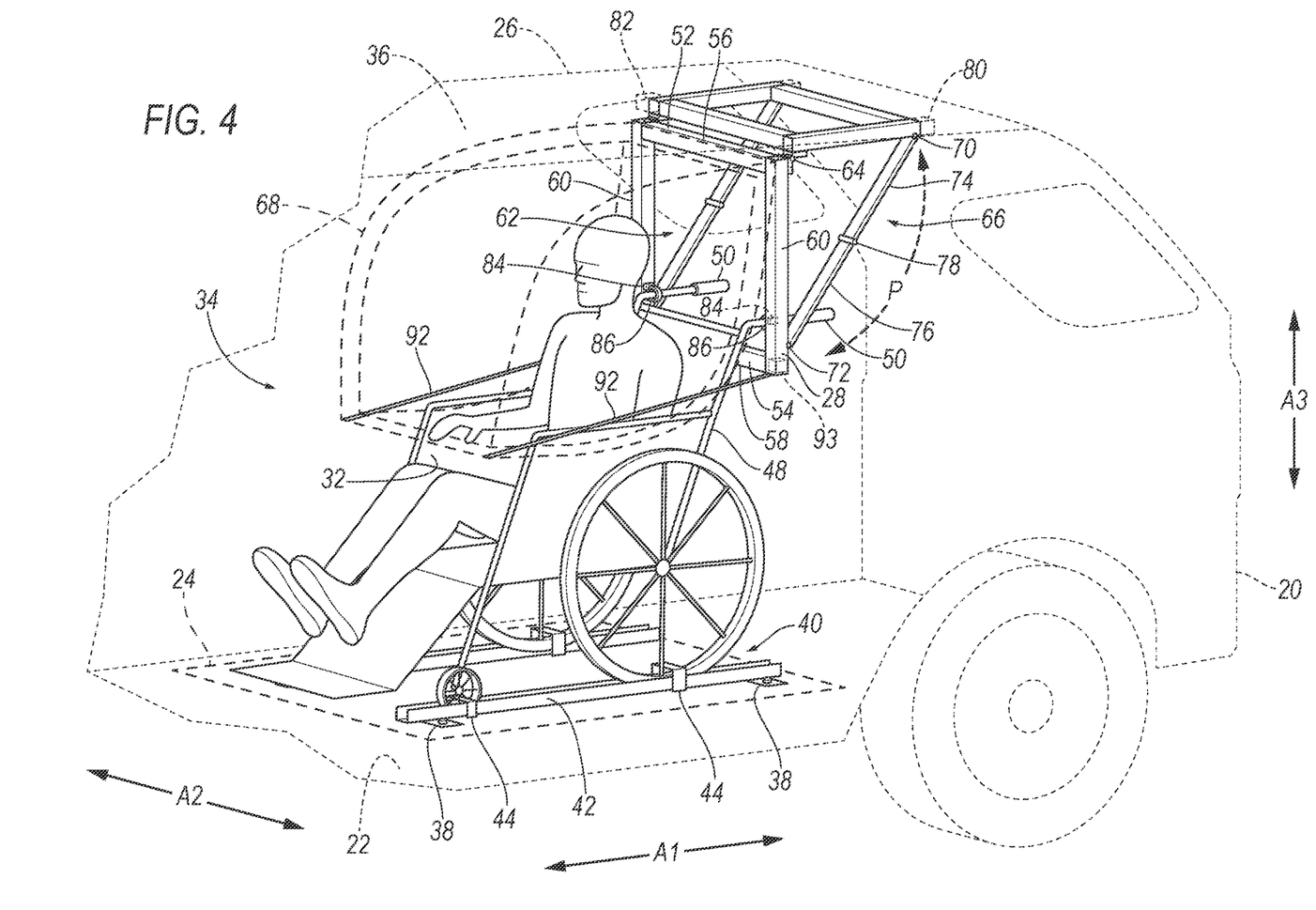
FIG. 4 is a perspective view of the vehicle having the airbag in an inflated position.

The floor mount 40, shown, for example, in FIGS. 1, 3, and 4, is configured to engage and secure the personal mobility device 32 within the passenger compartment 34. The floor mount 40 may include channels 42 designed to engage wheels of the personal mobility device 32. Specifically, the channels 42 are sized and shaped to receive wheels of the personal mobility device 32 such to resist lateral movement of the personal mobility device 32 during operation of the vehicle 20. The channels 42 may be spaced from each other along the lateral axis A2 and parallel to each other along the longitudinal axis A1. The channels 42 may be fixed to the floor 22 via the anchors 38. The floor mount 40 may include any suitable number of latches 44, tethers, etc., to secure the wheels or other structure of the personal mobility device 32 to the vehicle 20 and limit relative movement therebetween. The latches 44 may limit the movement of the personal mobility device 32 in the channels 42, e.g., via engagement with the wheels. The latches 44 may be electronic or manual, e.g., each latch 44 may include a solenoid. Actuation of the solenoid, e.g., in response to a command from a computer 46, may engage the latch with the wheel.

The personal mobility device 32 may be of any suitable type that supports a seated occupant and provides mobility to the seated occupant, i.e., the personal mobility device 32 transports the seated occupant outside of the vehicle 20 and moves the seated occupant in the passenger compartment 34 during ingress to and egress from the vehicle 20. The personal mobility device 32 supports the seated occupant in the passenger compartment 34 during operation of the vehicle 20. The personal mobility device 32 may include a frame 48 that supports other components of the personal mobility device 32. The personal mobility device 32 may include handles 50, e.g., for pushing the personal mobility device 32. The personal mobility device 32 may include wheels, as described above. As examples including wheels, the personal mobility device 32 may be a wheelchair or a scooter. As another example, the personal mobility device 32 may include a continuous track. In such an example, the continuous track is in contact with ground and personal mobility device 32 may include wheels that transmit force to the continuous track. The personal mobility device 32 may include a motor operably connected to the wheels and a battery that provides power to the motor. The personal mobility device 32 may be for example, a wheelchair, an electric scooter, etc.

The base 28 is generally planar, extending from a first end 52 to a second end 54. For example, the base 28 may include a first crossbar 56 at the first end 52 and a second crossbar 58 at the second end 54. The first crossbar 56 and the second crossbar 58 may be elongated along the lateral axis A2. The first crossbar 56 and the second crossbar 58 may be spaced from each, e.g., along the longitudinal axis A1 and/or the vertical axis A3 (depending on whether the base 28 is at the stowed position or the deployed position). The base 28 may include a pair of connecting bars 60 that connect first crossbar 56 to the second crossbar 58.

The base 28 may define an opening 62 (illustrated in FIGS. 3 and 4). For example, the opening 62 may be defined by the first crossbar 56, the second crossbar 58, and the pair of connecting bars 60. The first crossbar 56, the second crossbar 58, and the pair of connecting bars 60 may surround the opening 62. The opening 62 may be sized to receive handles 50 of the personal mobility device 32. For example, the pair of connecting bars 60 may be spaced from each other along the lateral axis A2 such that the opening 62 therebetween is wider than handles of a standard sized wheelchair, e.g., at least 28 inches, or is wider than handles of a transport or pediatric sized wheelchair, e.g., at least 18 inches.

The base 28 is pivotally supported by the roof 26, i.e., such that the base 28 can pivot relative to the roof 26. For example, a hinge 64 may connect the first end 52 of the base 28 to the roof 26. The base 28 may pivot at the hinge 64 from the stowed position to the deployed position, and vice versa. Movement of the base 28 from the stowed position to the deployed position, or vice versa, defines a path P. The path P is a volume traversed by the base 28 from the one of the positions to the other. The path P may be generally arcuate and extend downward and forward from the roof 26.

The base 28 in the stowed position is at the roof 26, e.g., the first end 52 and the second end 54 may be at the roof 26. The base 28 in the stowed position may be parallel to the roof 26. For example, the base 28 and the roof 26 may both extend along the longitudinal axis A1 and the lateral axis A2. As another example, in the stowed position the first end 52 and the second end 54 of the base 28 may be proximate the roof 26. The first end 52 may be forward of the second end 54 of the base 28 in the stowed position. The connecting bars 60 may be elongated along the longitudinal axis A1 when the base 28 is in the stowed position.

The base 28 in the deployed position is rearward of the seating area 24, e.g., along the longitudinal axis A1. The base 28 in the deployed position extends transversely from the from roof 26. For example, the base 28 in the deployed position may extend along vertical axis A3 perpendicular to the roof 26 extending along the longitudinal axis A1. The pair of connecting bars 60 may be elongated along the vertical axis A3. In the deployed position, the first end 52 may be proximate the roof 26, e.g., connected at the hinge 64, and the second end 54 may be distal, e.g., spaced from the roof 26 along the vertical axis A3. In other words, the first end 52 may be between the roof 26 and the second end 54 along the vertical axis A3 when the base 28 is in the deployed position. The handles 50 of the personal mobility device 32 may be disposed in the opening 62 of base 28 when the base 28 in the deployed position. For example, the handles 50 may extend along the longitudinal axis A1 from in front of the base 28, through the opening 62, to rearward of the base 28. The handles 50 may be between the connecting bars 60 along the lateral axis A2 and between the first crossbar 56 and the second crossbar 58 along the vertical axis A3.

A brace 66 may be connected to the base 28 and the roof 26. The brace 66 supports the base 28 in the deployed position, e.g., to reduce movement of the base 28 during an impact to the vehicle 20. For example, the brace 66 may enable the base 28 to provide a stiffer reaction surface to the airbag 68 in the inflated position. As another example, the brace 66 may limit forward movement of the base 28 beyond the deployed position. The brace 66 may be connected to the roof 26 at a first hinge 70 and to the base 28 at a second hinge 72.

The brace 66 may include a first bar 74 and a second bar 76. The first bar 74 may be connected to the roof 26, e.g., with the first hinge 70. The second bar 76 may be connected to the base 28, e.g., with the second hinge 72. The first bar 74 may be connected to the second bar 76 at a third hinge 78. The first bar 74 may be connected to the roof 26 opposite the third hinge 78, e.g., with the first hinge 70 and the third hinge 78 at opposite distal ends of the first bar 74. The second bar 76 may be connected to the base 28 opposite the third hinge 78, e.g., with the second hinge 72 and the third hinge 78 at opposite distal ends of the second bar 76. Movement of the base 28 from the stowed position to the deployed position, or vise versa, may pivot the first bar 74 relative to the roof 26 at the first hinge 70, the second bar 76 relative to the base 28 at the second hinge 72, and the first bar 74 relative to the second bar 76 at the third hinge 78.

The brace 66 may extend transverse to the roof 26 and the base 28 in the deployed position. The brace 66 may extend rearward from the base 28 away from seating area 24 and the upward toward the roof 26. For example, the brace 66 may be elongated diagonally from the base 28 to the roof 26 relative to the longitudinal axis A1 and the vertical axis A3.

The vehicle 20 may include a lock 80 operatively engaged with the base 28 to selectively maintain the base 28 in the deployed position. For example, the lock 80 may inhibit motion of base 28 relative to the roof 26, the brace 66 relative to the base 28, and/or the brace 66 relative the roof 26, during an impact to the vehicle 20. The lock 80 may selectively inhibit movement of the first bar 74 relative to the roof 26 or the second bar 76 relative to the base 28. The lock 80 may engage the brace 66 when the vehicle 20 is subject to deceleration above a threshold. For example, the lock 80 may be an inertia actuated lock that includes a weighted pawl, a ratchet gear, a spring, etc. Inertia may urge the pawl into engagement with the gear and inhibit rotation of the brace 66 relative to the roof 26 and/or base 28 when the vehicle 20 is subject to deceleration above the threshold. The lock 80 may include a solenoid or other electromechanical structure that actuates to engage the lock 80 with the brace 66 to inhibit motion, e.g., in response to receiving a command from a computer 46. The lock 80 may be supported by the roof 26 at the first hinge 70 connecting the roof 26 to the brace 66. The lock 80 may be supported by the base 28 at the third hinge 78 connecting the base 28 to the brace 66 (not shown). The lock 80 may be supported at any other suitable position such that lock 80 selectively maintains the base 28 in the deployed position, e.g., at the hinge 64 connecting the base 28 to the roof 26.

The vehicle 20 may include an actuator 82 that moves the base 28 from the stowed position to the deployed position, and vice versa. The actuator 82 may be an electro-mechanical, hydraulic, and/or pneumatic device. The actuator 82 may include a motor, reduction gears (such as a worm gear), a piston and cylinder arrangement, and/or any other suitable structure that can generate and apply force to pivot the base 28 relative to the roof 26. For example, the actuator 82 may be fixed to the roof 26 and be operatively connected to the base 28 such that torque is applied from the actuator 82 to the first end 52 of the base 28. The actuator 82 may move the base 28, for example, in response to a command from the computer 46.

The vehicle 20 may include an attachment assembly 84 (illustrated in FIGS. 3 and 4) configured to engage and further secure the personal mobility device 32 within the passenger compartment 34, e.g., by limiting movement of the personal mobility device 32 relative to the base 28. The attachment assembly 84 may be fixed to the base 28, e.g., with a fastener or other suitable structure. The attachment assembly 84 may include any suitable number of latches, tethers 86, etc., that are attachable to the frame 48, the handles 50, or other structure of the personal mobility device 32.

The vehicle 20 may include an airbag housing 88. The airbag housing 88 houses the airbag 68 in the uninflated position and supports the airbag 68 in the inflated position. The airbag 68 may be rolled and/or folded in the uninflated position to fit within the airbag housing 88. The airbag housing 88 may be of any suitable material, e.g., a rigid polymer, a metal, a composite, or a combination of rigid materials. The housing may be fixed to the base 28, e.g., to the first crossbar 56 at the first end 52.

The airbag 68 is inflatable from the uninflated position to the inflated position. The airbag 68 defines an inflation chamber. The inflation chamber receives inflation medium, e.g., from an inflator 90, to inflate the airbag 68 from the uninflated position to the inflated position. For example, one or more sheets of woven material may be sewn, or otherwise fixed, to enclose the inflation chamber and provide shape to the airbag 68 in the inflated position. The airbag 68 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIG. 3, the airbag 68 in the uninflated position may be supported by the base 28 closer to the first end 52 proximate the roof 26 than the second end 54 distal form the roof 26. For example, the airbag 68 in the uninflated position may be at the first end 52 and fixed to the first crossbeam via the airbag housing 88.

With reference to FIG. 4, the airbag 68 in the inflated position extends forward of the base 28 toward the seating area 24. In other words, the airbag 68 in the inflated position may extend from the housing fixed to the base 28 toward the front of the vehicle 20, e.g., along sides, and over a top, of the personal mobility device 32 or seat 30 (not shown) in the seating area 24. The airbag 68 in the inflated position may be quarter-sphere shaped, i.e., generally shaped as half of a hemi-sphere. The airbag 68 in the inflated position may be sized to surround an occupant seated in the personal mobility device 32 or seat 30 (not shown) in the seating area 24. For example, the airbag 68 in the inflated position may extend from the base 28 along sides, above, and in front of the occupant, e.g., to control forward and sideways kinematics of the occupant.

The inflator 90 is in fluid communication with the inflation chamber of the airbag 68. The inflator 90 may be, for example, at least partially in the inflation chamber to deliver inflation medium directly to the inflation chamber or may be connected to the inflation chamber through fill tubes, diffusers, etc. The inflator 90 inflates the airbag 68 with inflation medium, such as a gas, to move the airbag 68 from the uninflated position to the inflated position. The inflator 90 may be supported by any suitable component. For example, the inflator 90 may be fixed to the base 28 with the housing. The inflator 90 may be, for example, a pyrotechnic inflator that uses a chemical reaction to drive inflation medium to the airbag 68. The inflator 90 may be of any suitable type, for example, a cold-gas inflator.

One or more tethers 92 may be connected to the airbag 68 and the base 28. For example, one tether 92 may be at a right side of the airbag 68 and another tether 92 may be at a left side of the airbag 68. In other words, the airbag 68 may be between such tethers 92 along the lateral axis A2. The tethers 92 may guide inflation of the airbag 68 and support the airbag 68 in the inflated position, e.g., to control kinematics of the occupant. One end of each of the tethers 92 may be fixed to the base 28, e.g., to the connecting bars 60 and closer to the second crossbar 58 than the first crossbar 56. An opposite end of the tethers 92 may be fixed to the airbag 68. The tethers 92 may be elongated along the vertical axis A3 when the base 28 is in the deployed position and the airbag 68 is in the uninflated position, as shown in FIG. 3. The tethers 92 may extend along opposite sides of the airbag 68 in the inflated position, as shown in FIG. 4. For example, the tethers may extend from the base 28 toward the front of the vehicle 20 to bottom outside corners of the airbag 68 in the inflated position.

The vehicle 20 may include one or more tether retractors 93 that generate tension in the tethers 92. The tether retractors 93 may generate such tension in response to receiving a command from the computer 46. The tether retractors 93 may be supported by the base 26. For example, the tether retractors 93 may be fixed to the second cross bar 58 or the connecting bar 60 at the second end 64. The tether retractors 93 may be operatively engaged with the tether retractors 93 and apply force thereto. For example, tether retractors 93 retract may each include a piston coupled to the tethers 92. Movement of the pistons may apply force to the tethers 92. As another example, tether retractors 93 may each include a spool around which the tethers 92 are wound. Rotation of the spools may apply force to tethers 92. The tether retractors 93 can each include pyrotechnic material. The pyrotechnic may be combustible to produce gas. The pyrotechnic material may be formed of a solid mixture of substances that, when ignited, react to produce the gas. For example, the pyrotechnic material may be formed of sodium azide ($NaNO_3$), potassium nitrate ($KNO_3$), and silicon dioxide ($SiO_2$), which react to form nitrogen gas ($N_2$). Actuation of the pyrotechnic material, e.g., in response to an instruction from the computer 46, may generate gas and urge the piston within a cylinder, apply torque to the spool, etc.

The vehicle 20 may include one or more sensors 94 configured to detect an object in the path P of the base 28. For example, one or more object detection sensors, e.g., a camera, a CCD image sensor, a CMOS image sensor, a proximity sensor, a capacitive proximity sensor, a photoelectric sensor, an infrared proximity sensor, etc., may be supported by vehicle 20 in the passage cabin and oriented toward the path P of movement of the base 28.

The vehicle 20 may include one or more sensors 96 configured to detect a personal mobility device 32 in the seating area 24. For example, one or more object detection sensors may be supported by the vehicle 20 in the passage cabin and oriented toward the seating area 24 above the floor mount 40. As another example, pressure sensors may be supported by the floor 22 in the seating area 24 and indicate that a personal mobility device 32 is in the seating area 24 when weight above a threshold is detected. As another example, a switch, proximate sensors, etc., may be attached to the floor mount 40 in the seating area 24 and detect when a personal mobility device 32 is secured to the floor mount 40.

The vehicle 20 may include one or more impact sensors 100 configured to detect an impact to the vehicle 20. The impact sensor 100 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 100 may be located at numerous points in or on the vehicle 20.

Figure 5:
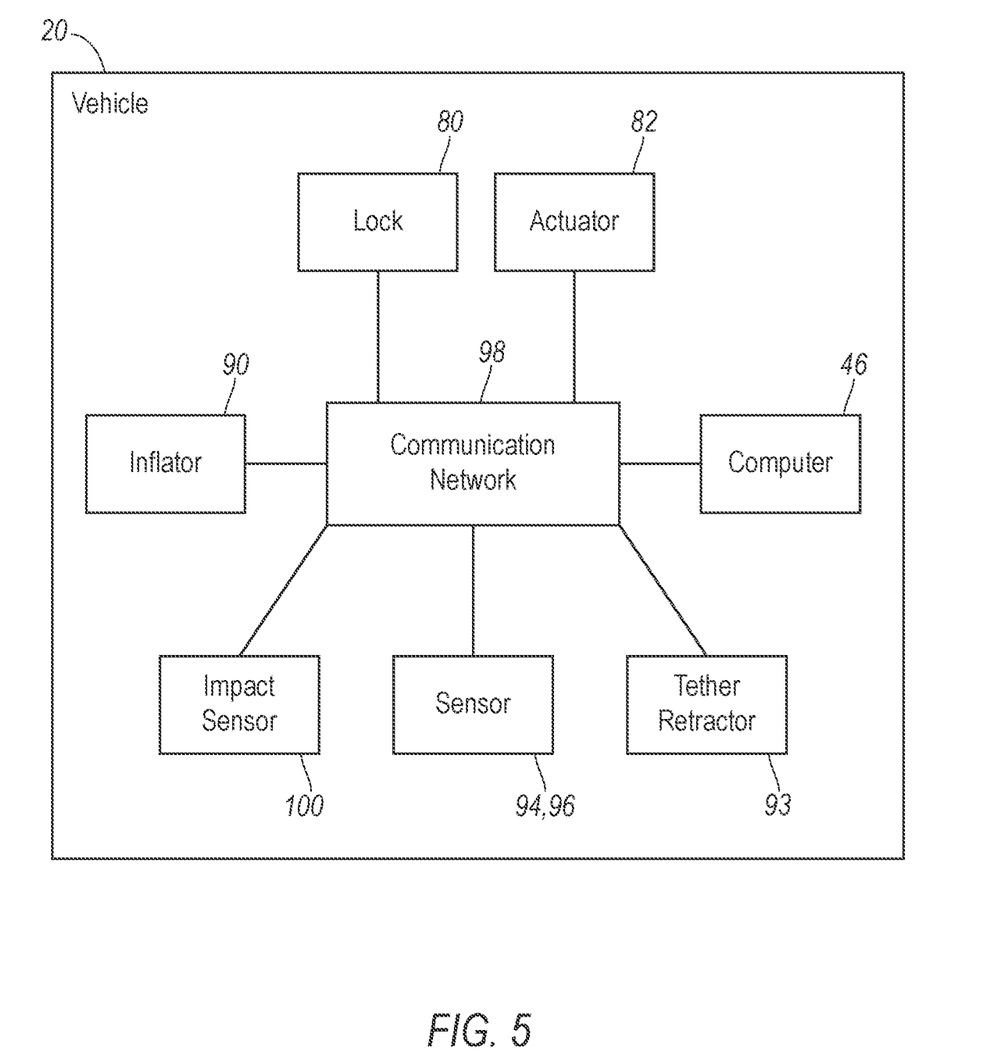
FIG. 5 is a block diagram of components of the vehicle.

The computer 46 is a microprocessor-based controller implemented via circuits, chips, or other electronic components. The computer 46 includes a processor and a memory such as are known. The memory includes one or more forms of computer readable media, and stores instructions executable by the computer 46 for performing various operations, including as disclosed herein. The computer 46 may be programmed to execute operations disclosed herein. Specifically, the memory stores instructions executable by the processor to execute the operations disclosed herein and electronically stores data and/or databases. For example, the computer 46 may include one or more dedicated electronic circuit including an ASIC (Application Specific Integrated Circuit) that is manufactured for a particular operation. In another example, the computer 46 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 46 may be a set of computer 46s communicating with one another.

The computer 46 is generally arranged for communications on a communication network 98 that can include a bus in the vehicle 20 such as a controller area network (CAN) or the like, and/or other wired and/or wireless mechanisms. Via the communication network 98, the computer 46 may transmit messages to various devices in the vehicle 20, and/or receive messages (e.g., CAN messages) from the various devices, e.g., the inflator 90, the actuator 82, the various sensors, etc. Alternatively or additionally, in cases where the computer 46 comprises a plurality of devices, the communication network 98 may be used for communications between devices represented as the computer 46 in this disclosure.

The computer 46 may be programmed to, i.e., the memory stores instructions executable by the processor to, command the actuator 82 to move the base 28 in response to detecting the personal mobility device 32 in the seating area 24. The computer 46 may detect a personal mobility device 32 in the seating area 24 based on data from the sensors 96 configured to detect a personal mobility device 32 in the seating area 24. The data may be received by the computer 46 from the sensors 96 via the communication network 98. The data from the sensors 96 may indicate, for example, that an object is detected in the seating area 24 above the floor mount 40, that weight above a threshold amount is being applied to the seating area 24, that the floor mount 40 is engaged with a personal mobility device 32, etc. The computer 46 may, in response to receiving such data, send a command to the actuator 82 specifying movement of the base 28 to the deployed position. The computer 46 may transmit such command via the communication network 98.

The computer 46 may be programmed to inhibit the actuator 82 from moving the base 28 in response to detecting an object in the path P of the base 28. The computer 46 may detect an object in the path P of the base 28 based on data from the sensors 94 configured to detect an object in the path P of the base 28. The data may be received by the computer 46 from the sensors 94 via the communication network 98. The data from the sensors 94 may indicate, for example, that an object is detected in image data from a camera or the like that is pointed at the path P, that an object is in front of and/or within a threshold range of a proximity sensor or the like pointed at the path P, etc. The computer 46 may, in response to receiving such data, send a command to the actuator 82 specifying stopping movement of the base 28. The computer 46 may transmit such command via the communication network 98.

The computer 46 may be programmed to inflate the airbag 68. For example, under normal operating conditions of the vehicle 20, the airbag 68 is in the uninflated position. In the event of an impact, the impact sensor 100 may detect the impact and transmit a signal through the communication network 98 to the computer 46. In response to receiving such signal, the computer 46 may transmit a signal through the communication network 98 to the inflator 90 to inflate the airbag 68 and to the lock 80 to inhibit movement of the base 28 relative to the roof 26. In response to receiving such signal, the inflator 90 may discharge and inflate the airbag 68 to the inflated position to control kinematics of the seat 30 and/or the occupant. The base 28 may provide a reaction surface to the airbag 68 in the inflated position.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a floor defining a seating area;
   a roof above the floor;
   a base supported by the roof and pivotable from a stowed position at the roof to a deployed position rearward of the seating area; and
   an airbag in an uninflated position supported by the base in the deployed position and inflatable from the uninflated position to an inflated position that is forward of the base toward the seating area.

2. The vehicle of claim 1, wherein the base in the deployed position includes a proximate end at the roof and a distal end spaced from the roof, the airbag in the uninflated position being closer to the proximate end than the distal end.

3. The vehicle of claim 1, wherein the base defines an opening sized to receive handles of a personal mobility device secured in the seating area.

4. The vehicle of claim 1, further comprising an actuator that moves the base from the stowed position to the deployed position and from the deployed position to the stowed position.

5. The vehicle of claim 4, further comprising a computer having a processor and memory storing instructions executable by the processor to command the actuator to move the base in response to detecting a personal mobility device in the seating area.

6. The vehicle of claim 4, further comprising a computer having a processor and memory storing instructions executable by the processor to inhibit the actuator from moving the base in response to detecting an object in a path of the base.

7. The vehicle of claim 1, further comprising an inflator fixed to the base and in fluid communication with the airbag.

8. The vehicle of claim 1, further comprising a brace connected to the base and the roof.

9. The vehicle of claim 8, wherein the brace includes a first bar and a second bar, the first bar connected to the second bar at a hinge.

10. The vehicle of claim 9, wherein the first bar is connected to the roof opposite the hinge and the second bar is connected to the base opposite the hinge.

11. The vehicle of claim 8, wherein the brace extends transverse to the roof and the base in the deployed position.

12. The vehicle of claim 8, wherein the brace extends rearward from the base, away from the seating area, and toward the roof.

13. The vehicle of claim 1, further comprising a lock operatively engaged with the base to selectively maintain the base in the deployed position.

14. The vehicle of claim 1, further comprising a floor mount configured to engage a personal mobility device within the seating area.

15. The vehicle of claim 14, further comprising an attachment assembly fixed to the base and configured to engage the personal mobility device.

16. The vehicle of claim 1, wherein the airbag in the inflated position is quarter-sphere shaped and sized to surround an occupant seated in the seating area.

17. The vehicle of claim 1, further comprising a tether connected to the airbag and the base.

18. The vehicle of claim 17, further comprising a second tether connected to the airbag and the base, the tether and the second tether extending along opposite sides of the airbag in the inflated position.

19. A vehicle, comprising:
a floor defining a seating area;
a roof above the floor;
a base supported by the roof and pivotable from a stowed position at the roof to a deployed position rearward of the seating area, the base defining an opening sized to receive handles of a personal mobility device secured in the seating area; and
an airbag supported by the base and inflatable from an uninflated position to an inflated position that is forward of the base toward the seating area.

20. A vehicle, comprising:
a floor defining a seating area;
a floor mount configured to engage a personal mobility device within the seating area;
a roof above the floor;
a base supported by the roof and pivotable from a stowed position at the roof to a deployed position rearward of the seating area; and
an airbag supported by the base and inflatable from an uninflated position to an inflated position that is forward of the base toward the seating area.

* * * * *